US010235435B2

(12) United States Patent
Mueller et al.

(10) Patent No.: US 10,235,435 B2
(45) Date of Patent: *Mar. 19, 2019

(54) DATABASE APPLICATION FEDERATION

(71) Applicant: BMC SOFTWARE, INC., Houston, TX (US)

(72) Inventors: Douglas Mueller, Palo Alto, CA (US); Jiani Chen, San Jose, CA (US)

(73) Assignee: BMC Software, Inc., Houston, TX (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/839,167

(22) Filed: Aug. 28, 2015

(65) Prior Publication Data

US 2015/0370867 A1 Dec. 24, 2015

Related U.S. Application Data

(63) Continuation of application No. 11/538,393, filed on Oct. 3, 2006, now Pat. No. 9,122,719.

(60) Provisional application No. 60/745,869, filed on Apr. 28, 2006.

(51) Int. Cl.
*G06F 7/00* (2006.01)
*G06F 17/00* (2006.01)
*G06F 17/30* (2006.01)
*G06F 9/445* (2018.01)

(52) U.S. Cl.
CPC .... *G06F 17/30557* (2013.01); *G06F 9/44505* (2013.01); *G06F 17/3056* (2013.01); *G06F 17/30389* (2013.01)

(58) Field of Classification Search
CPC ......... G06F 17/30483; G06F 17/30557; G06F 17/44505
USPC ....................................................... 707/600
See application file for complete search history.

(56) References Cited

U.S. PATENT DOCUMENTS

| | | | | |
|---|---|---|---|---|
| 5,257,366 A | * | 10/1993 | Adair | ................ G06F 17/30557 |
| 5,463,555 A | | 10/1995 | Ward et al. | |
| 6,363,411 B1 | * | 3/2002 | Dugan | .............. H04M 3/42136 379/201.01 |
| 6,529,992 B1 | * | 3/2003 | Thomas | .................. G06F 9/445 711/1 |
| 6,546,433 B1 | * | 4/2003 | Matheson | ................. G06F 8/38 719/318 |
| 7,185,015 B2 | * | 2/2007 | Kester | .................... G06F 21/50 |

(Continued)

*Primary Examiner* — Binh V Ho
(74) *Attorney, Agent, or Firm* — Brake Hughes Bellermann LLP (57) ABSTRACT

According to an aspect, a system for assisting a user with configuration management may include a configuration management database (CMDB) system having a plurality of configuration items, and an application external to the CMDB system. The CMDB system may associate an invocation string with a first configuration item and the application external to the CMDB system. The CMDB system may obtain information from the first configuration item, where the information from the first configuration item provides information for launching the application external to the CMDB system. The CMDB system may insert the information from the first configuration item into the invocation string to create an application execution command. The CMDB system may execute the application external to the CMDB system, independently from the CMDB system, based on the application execution command.

20 Claims, 4 Drawing Sheets

(56) References Cited

U.S. PATENT DOCUMENTS

| | | | |
|---|---|---|---|
| 7,664,806 B1 | 2/2010 | Koudas et al. | |
| 7,873,940 B2 | 1/2011 | Sanghvi et al. | |
| 7,949,628 B1 * | 5/2011 | Blazek | G06F 8/70 |
| | | | 707/600 |
| 7,971,187 B2 | 6/2011 | Sanghvi et al. | |
| 8,037,106 B2 | 10/2011 | Barrenechea | |
| 8,112,451 B1 * | 2/2012 | Graham | G06Q 10/08 |
| | | | 707/802 |
| 9,122,719 B2 | 9/2015 | Mueller et al. | |
| 2002/0035625 A1 * | 3/2002 | Tanaka | H04L 41/0856 |
| | | | 709/223 |
| 2002/0059164 A1 * | 5/2002 | Shtivelman | G06F 17/30722 |
| 2002/0144129 A1 * | 10/2002 | Malivanchuk | G06F 21/56 |
| | | | 713/188 |
| 2003/0191769 A1 * | 10/2003 | Crisan | G06F 17/30483 |
| 2004/0057074 A1 * | 3/2004 | Ohishi | G06F 9/445 |
| | | | 358/1.15 |
| 2005/0021713 A1 * | 1/2005 | Dugan | H04M 3/42136 |
| | | | 709/223 |
| 2005/0050068 A1 * | 3/2005 | Vaschillo | G06F 17/30569 |
| 2005/0055491 A1 | 3/2005 | Macri et al. | |
| 2005/0278342 A1 * | 12/2005 | Abdo | G06F 9/4843 |
| 2006/0004875 A1 * | 1/2006 | Baron | G06Q 10/06 |
| 2006/0178954 A1 * | 8/2006 | Thukral | G06Q 10/087 |
| | | | 705/28 |
| 2006/0179058 A1 * | 8/2006 | Bram | G06F 21/121 |
| 2006/0239215 A1 * | 10/2006 | Munje | G06F 17/30575 |
| | | | 370/310 |
| 2007/0100892 A1 * | 5/2007 | Kephart | G06Q 10/06 |
| 2007/0250812 A1 * | 10/2007 | Sanghvi | G06F 8/30 |
| | | | 717/117 |
| 2007/0261017 A1 | 11/2007 | Sanghvi et al. | |
| 2008/0114770 A1 * | 5/2008 | Chen | G06F 17/30566 |

\* cited by examiner

DATABASE APPLICATION FEDERATION

CROSS REFERENCE TO RELATED APPLICATIONS

This application is a continuation application of U.S. application Ser. No. 11/538,393, filed Oct. 3, 2006, entitled "Database Application Federation", which claims priority to and the benefit of U.S. Provisional Application No. 60/745,869, filed Apr. 28, 2006, entitled "CMDB Federation," which are hereby incorporated by reference in their entireties.

BACKGROUND

A Configuration Management Database (CMDB) is a database that is used to retain information about the components in an information system (and the relationships between those components) that are used by an organization's Information Technology (IT) services. In this context, system components are often referred to as "configuration items." A configuration item can be any conceivable resource or component, including software, hardware, documentation, facilities and personnel, as well as any combination of these. The process of configuration management seeks to specify, control, and track configuration items and any changes made to them in a comprehensive and systematic fashion.

The Information Technology Infrastructure Library (ITIL.®.) best practices standards include specifications for configuration management. According to ITIL specifications, the four major tasks of configuration management are: (1) identification of configuration items to be included in the CMDB; (2) control of data to ensure that it can only be changed by authorized individuals; (3) status maintenance, which involves ensuring that the current status of any configuration item is consistently recorded and kept updated; and (4) verification, through audits and reviews of the data to ensure that it is accurate. (ITIL is a registered trademark of The Lords Commissioners of Her Majesty's Treasury Acting Through The Office of Government Commerce and Central Computer and Telecomunications Agency, United Kingdom.)

Within a configuration database, the concept of data federation is an important scalability and complexity management issue. Generally speaking, data federation is the concept of storing additional or related data about a configuration item (stored in a first data store) in another, second, product or database. This approach to distributing data keeps the size, scope and responsibility of the configuration database controlled and allows the use of existing databases as they currently exist.

In the prior art, federated data is generally accessed by manually executing an application distinct from the federated database. For example, federated data may be retained in a second database (accessible through a separate database management system) or a distinct product (such as a separate configuration management application). Data federated in this manner may be accessed by developing customized source integration logic or by invoking a pre-determined or fixed instance of a second application. In the first of these approaches, custom logic (i.e., software) is developed for each federated database that allows a more automated interaction with the specified data store. In the second approach, the second application is used to manually search for the desired data. In yet a third approach, links to an application that could manipulate an instance of a federated data object are provided, but no ability to modify the invocation of this link (including parameter passing) is possible.

Thus, it would be beneficial to provide a mechanism to automatically and dynamically invoke a specified application from within a database in general, and a configuration management database in particular.

SUMMARY

In one embodiment, the invention provides a method to register an external application with a database. The method includes identifying an entry in the database, identifying the external application and associating a command string with the entry and the external application external, wherein the command string is formed by a combination of predetermined portions (e.g., specified at the time the external application was associated with the entry) and dynamic portions comprising information to be obtained from the identified entry at run-time. The command string configured to cause the external application to execute once its dynamic portions are provided at run-time.

In another embodiment, the invention provides a method to use a database having federated external applications. The method includes receiving a query for a database, retrieving an entry from the database in accordance with the query, identifying an external application associated with the entry, identifying an invocation string associated with the entry, substituting one or more values (e.g., attribute values) from the entry into the invocation string and using the invocation string (including the substituted values) to cause the external application to automatically execute. The external application may execute independently or provide data back to the invoking process.

In still another embodiment, the invention provides a system for assisting a user with configuration management. The system includes a configuration management database having multiple configuration items stored therein, an application external to the database, a means for associating an invocation string with a first configuration item and the external application, a means for obtaining information from the first configuration item (e.g., attribute values), a means for inserting the obtained configuration item information into the invocation string to create an application execution command and a means for causing the external application to execute based on the application execution command.

DETAILED DESCRIPTION

The following description is presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

In the context of an object-oriented configuration management database, a federation mechanism in accordance with the invention uses one or more execution definitions for each product, application or execution module to be federated. One illustrative product in which the inventive concept has been embodied is the BMC Atrium.™. CMDB configuration management database system. (BMC ATRIUM is a trademark of BMC Software, Inc. of Houston, Tex.) Each execution definition identifies a method of execution (e.g., command line, URL or web service), a mode of execution (e.g., interactive or stand-alone), zero or more invocation arguments, and the ability to specify data from a class of database entries, a specific database instance or a relationship associated with the instance.

Figure 1:
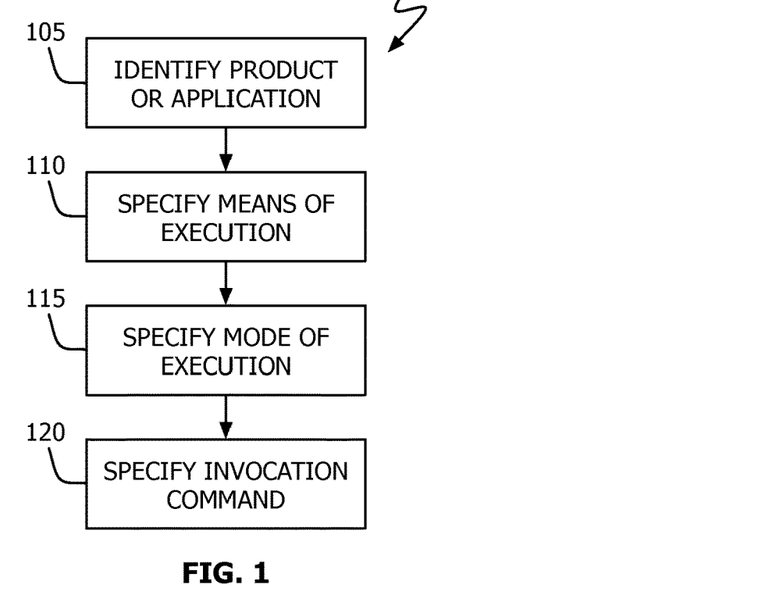
FIG. 1 shows, in flowchart form, a method in accordance with one embodiment of the invention.

Referring to FIG. 1, federation process 100 in accordance with the invention includes identifying the product, application or execution module that is to be federated (block 105). For example, it may be desired to associate a configuration item with an action request system so that the status of any help desk tickets ("action requests") related to the configuration item may be determined or modified. The means (block 110) and mode (block 115) may then specified. Illustrative invocation means include command line, URL and web service. Illustrative invocation modes include interactive and stand-alone. In an interactive mode, the targeted application (i.e., the application specified in accordance with block 105) may return data to the configuration management database. In a stand-alone mode, the targeted application may simply be invoked with a specified command string and, thereafter, run independently of the configuration management database. Finally, the invocation command for the targeted application is specified (block 120). In one embodiment, the invocation command is a character string that is used to actually invoke or execute the targeted application (e.g., a command line or URL string).

In accordance with the invention, the invocation command may include zero or more parameters, some of which may be static (i.e., fixed at the time the command is specified) and some of which may be dynamic (i.e., obtained from a configuration item at the time of invocation). For example, if the command invocation string is: http://www.bmc.com/info/?name=$Name$, the variable $Name$ may be obtained from the configuration item associated with the command string. Thus, if the value of the configuration item's 'Name' attribute was 'GreenMonster', the value GreenMonster would be substituted into the invocation command at the time of execution to yield http://www.bmc.com/info/?name='GreenMonster'.

In one embodiment, an application may also be federated with a class of configuration items. If a federated application is to be invoked based on a class relationship, one or more attributes of the class may be filtered prior to performing the above-described parameter substitution and invocation operations. For example, if application A is to be invoked every time a configuration item of class 'Monitor' is retrieved, one or more attribute values in the retrieved instance may be filtered to determine whether the application is actually invoked. Thus, if only ABC brand monitors associated with computer systems in the XYZ workgroup should be processed by application A, the "BrandName" and "Workgroup" attribute values of the specific instance associated with the current operation are checked. If they match (i.e., have values equal to ABC and XYZ, respectively), the application will be automatically invoked. Conversely, if the specific instance's attribute values do not match, the application is not invoked. In another embodiment, one or more attribute values may be used to specify which of two or more possible command string substitutions to perform.

Figure 2:
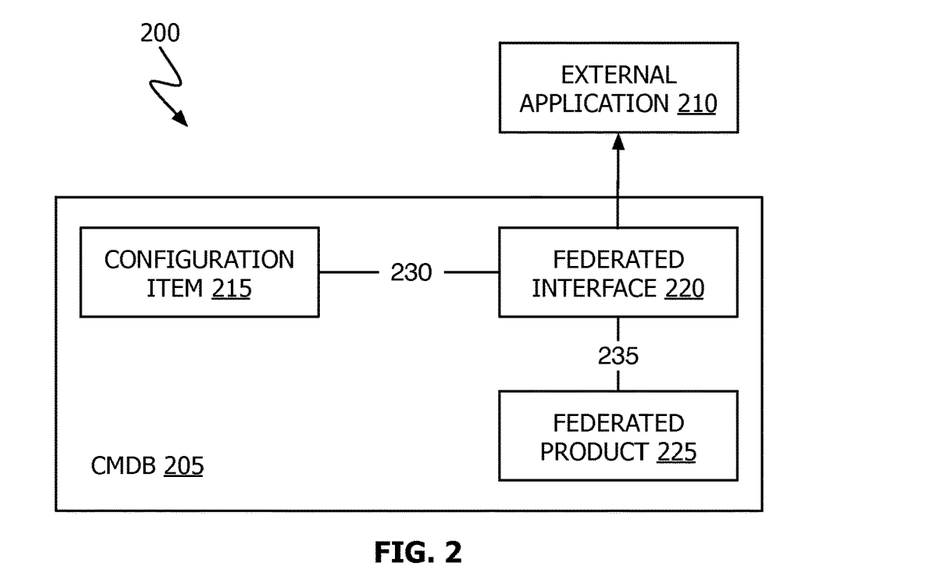
FIG. 2 shows, in block diagram form, configuration management database objects in accordance with one embodiment of the invention.

Referring to FIG. 2, system 200 in accordance with one embodiment of the invention includes configuration management database 205 and external application 210. Configuration management database 205 includes configuration item 215, federated interface object 220, federated product object 225, federated interface link object 230 and federated product link object 235. One of ordinary skill in the art will recognize that a configuration management database may include thousands or millions of configuration items, each of which may have zero or more relationships with other objects such as, for example, other configuration items. Furthermore, in accordance with the invention a single configuration item may be associated with more than one federated interface and a single federated product may be associated with a plurality of federated interface objects. (This latter case is useful when a single external application can be invoked for several different purposes.) Accordingly, system 200 presents a simplified structure for the purposes of describing the relevant details of the claimed invention and not as a representation of a fully functional implementation.

Figure 3:
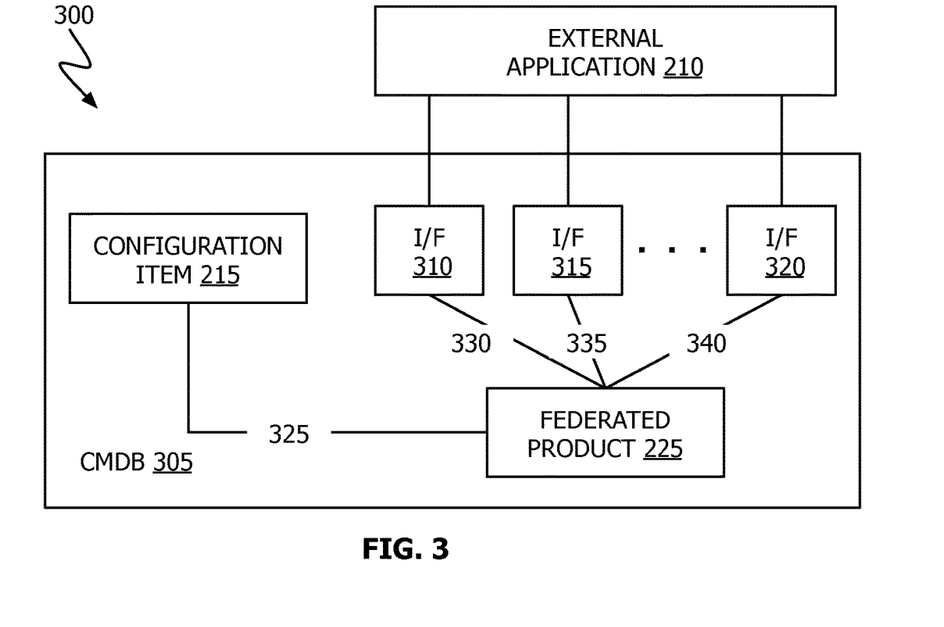
FIG. 3 shows, in block diagram form, configuration management database objects in accordance with another embodiment of the invention.

Referring to FIG. 3, system 300 in accordance with another embodiment of the invention includes configuration management database 305 and external application 210. Configuration management database 305 includes configuration item 215, federated interface objects 310, 315 and 320, federated product object 225, federated interface link object 325 and federated product link objects 330, 335 and 340. As shown, configuration item 215 is federated to product object 225 rather than to an interface object as shown in FIG. 2. In this configuration, configuration item 215 may cause external application 210 to be invoked through any of the interface objects (e.g., 310, 315 and 320) linked to product object 225 (e.g., through federated product link object 330, 335 and 340).

As previously noted, configuration item object 215 may represent substantially any resource--physical entities such as software, hardware, documentation, facilities and personnel as well as logical entities such as business processes or services. Further, in an object-oriented implementation, configuration item 215 may represent a specific instance of a resource (e.g., the laptop computer system assigned to person A) or a class of resources (e.g., all laptop computer systems in an organization). Federated interface object 220 includes the information necessary to invoke external application 210 for the particular configuration item to which it is linked (i.e., via federated interface link object 230). Table ZZ defines federated interface object 220 in accordance with one embodiment.

TABLE ZZ

Illustrative Federated Interface Object Attributes

| Attribute | Description |
|---|---|
| AccessMethod | Indicates the manner in which the target application is to be launched (e.g., a command line, a URL or a web service). |

TABLE ZZ-continued

Illustrative Federated Interface Object Attributes

| Attribute | Description |
| --- | --- |
| AccessMode | Indicates whether the target application is expected to return data (i.e., is interactive) or is to run independently (i.e., as a stand-alone application). |
| AccessString | The command line or URL string that is to be used to actually launch the target application. This string may include zero or more fixed parameters and zero or more variables, where variable values may be obtained from the specific configuration item, an attribute on a relationship to that specific item, or attributes of other configuration items that are associated with the specific item through following relationships between the items. |
| Result Field(s) | One or more fields used to accept return data from the target application (if the access mode is interactive). Thus, result fields permit the configuration management database to act as a conduit from the target application to the user (e.g., another application) of the configuration management database. |
| Security Field(s) | One or more fields that may be used to control which individuals (or user groups) may access the target application. |

Federated product object 225 includes the information necessary to identify the specific external application to be launched. Table YY defines federated product object 225 in accordance with one embodiment. Separating the information retained in federated interface 220 and federated product 225 objects, permits a single product (e.g., external application 210) to be invoked in a number of different ways (i.e., through multiple federated interface objects such as object 220) without duplicating much of the external product's information.

TABLE YY

Illustrative Federated Product Object Attributes

| Attribute | Description |
| --- | --- |
| ProductCode | Unique identifier for the product. |
| Name | Generic (human readable) product name. |

As shown in FIG. 2, configuration item 215 and federated interface object 220 are associated through federated interface link object 230. Similarly, federated interface object 220 and federated product object 225 are associated through federated product link object 235. In the parlance of object-oriented database technology, link objects 230 and 235 may be referred to as relationship objects or, more simply, relationships. Because a federated product (e.g., external product 210) might offer several types of federated data, each federated product object may be associated with a plurality of federated interface objects. Table XX defines federated interface link object 230 in accordance with one embodiment. Table WW defines federated product link object 235 in accordance with one embodiment.

TABLE XX

Illustrative Federated Interface Link Object Attributes

| Attribute | Description |
| --- | --- |
| LinkMethod | Indicates whether the link (i.e., relationship object) is associated with an instance of a configuration item object or a class of configuration items. |
| Query Field(s) | One or more fields through which a user can identify attributes and values on which to filter prior to invoking the associated external application. This field is applies when the LinkMethod attribute indicates the relationship is associated with a class object. Query fields provide a means to filter out or block activation of an external application when the associated configuration item instance's attribute values do not match that specified in a query field. For example, if the query field contained $SiteName$ != U.S., only those configuration item instances whose 'SiteName' attribute value was not 'U.S.' would cause the external application to be automatically invoked. |
| Source Fields | Identifies the associated configuration item (class and/or instance). |
| Destination Fields | Identifies the associated federated interface object (class and/or instance). |

TABLE WW

Illustrative Federated Product Link Object Attributes

| Attribute | Description |
| --- | --- |
| Source Fields | One or more fields that identify the associated external product object. |
| Destination Fields | One or more fields that identify the associated federated interface object (class and/or instance). |

Because some federated applications do not store configuration item attributes that also exist in the configuration management database (e.g., configuration management database 205), it may not be possible to use attribute substitution to match a configuration item to federated data. In these cases, a foreign key may be used to "tie" a configuration management database's configuration item (an instance or class object) to information stored in an external application. As used herein, a foreign key is a unique identifier in the federated product/application that maps to or identifies a specific configuration item in the configuration management database. To accommodate these cases, a foreign key relationship may be used to form an association between a configuration item (an instance or class object) and a federated product—where the foreign key relationship includes the foreign key value that uniquely ties a configuration item to an external product.

Figure 4:
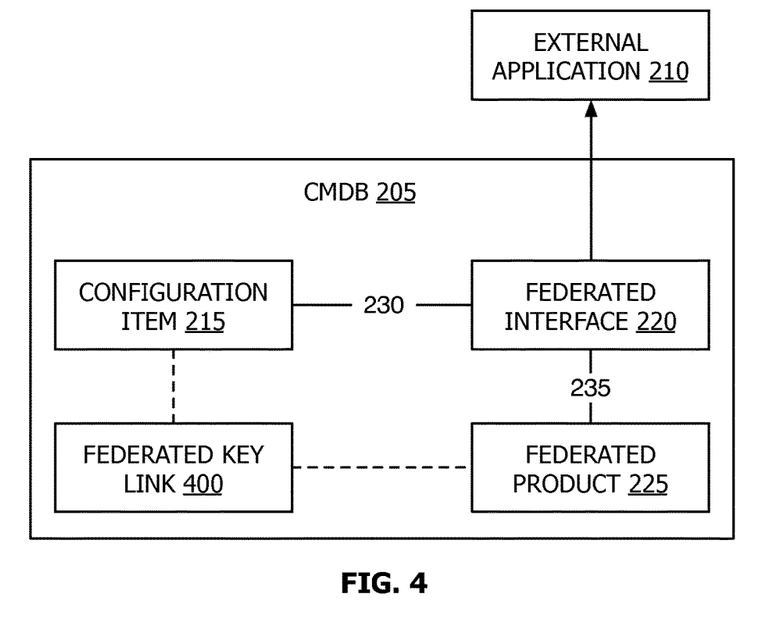
FIG. 4 shows, in block diagram form, configuration management database objects in accordance with another embodiment of the invention.

Referring to FIG. 4, in one embodiment the foreign key relationship may be implemented through federated key link object 400. As shown, federated key link object 400 logically couples configuration item 215 and federated product object 225 (via source and destination field references, see Table W). In this way, the foreign key value (retained in federated key link object 400) may be substituted into the information in a federated interface object (e.g., the AccessString field) to permit each configuration item to uniquely identify an external product. Table W defines federated key link object 400 in accordance with one embodiment.

TABLE VV

Illustrative Federated Key Link Object Attributes

| Attribute | Description |
| --- | --- |
| Key | The key value in the specified external product for specified configuration items. |
| Source Fields | One or more fields to identify an associated configuration item (instance or class). |
| Destination Fields | One or more fields that identify the associated external product. |

In summary, a federation mechanism in accordance with the invention permits one or more applications external to the database to be registered. Applications so registered may be automatically invoked in response to database queries—where such invocation utilizes data from specific database entries or instances.

Figure 5A:
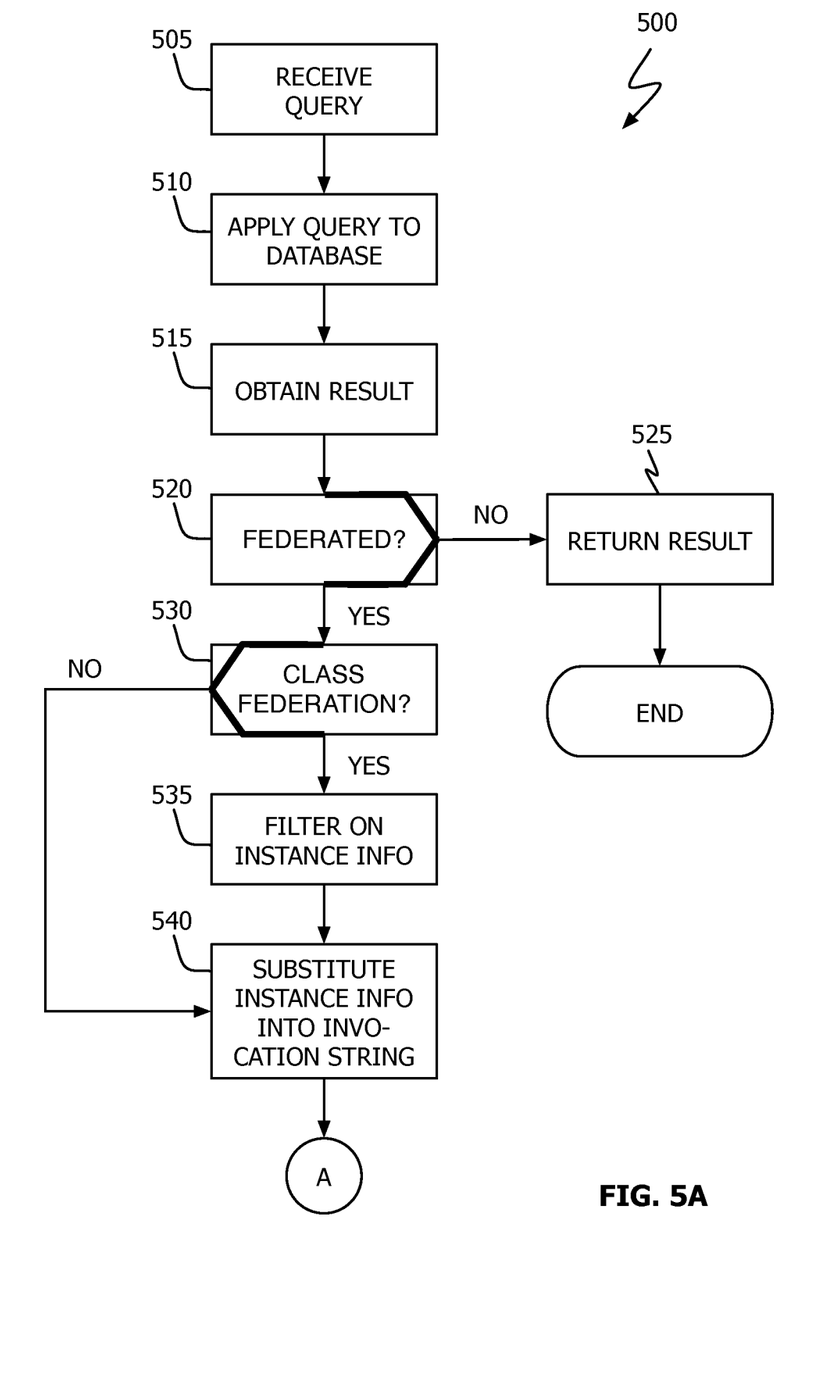
FIGS. 5A and 5B show, in flowchart form, an external application federation method in accordance with one embodiment of the invention.

In general then, and as shown in FIG. 5A, federation operation 500 in accordance with the invention begins when a query is received by a federated database (block 505). Once received, the query is applied to the database (block 510) and a result is obtained (block 515). If the result is not associated with an external product in accordance with the invention (the "No" prong of block 520), the result is returned as in the prior art (block 525) and processing completes. If the result is associated with an external application in accordance with the invention (the "Yes" prong of block 520), a check is made to determine if the retrieved entity is federated to a class (block 530). If the result is not federated to a class of database entries (the "No" prong of block 530), processing continues at block 540. If the result is federated to a class of database entries (the "Yes" prong of block 530), one or more values associated with the retrieved entity are compared against a user-specified pattern as discussed above (block 535), where after one or more values from the returned entity are substituted into the entities associated invocation string such as the AccessString attribute of a federated interface object (block 540). For convenience, once instance values have been substituted into the invocation string, the resulting quantity will be referred to as a command string. It is significant that filter operations in accordance with block 535 may include any combination of values or attributes of the retrieved entity (e.g., through logical operations such as AND, OR and NOT operations)—including values integral to the retrieved entity or any of the entities parent objects (i.e., values obtained through inheritance). Following the acts of block 240, processing continues as shown in FIG. 5B.

Figure 5B:
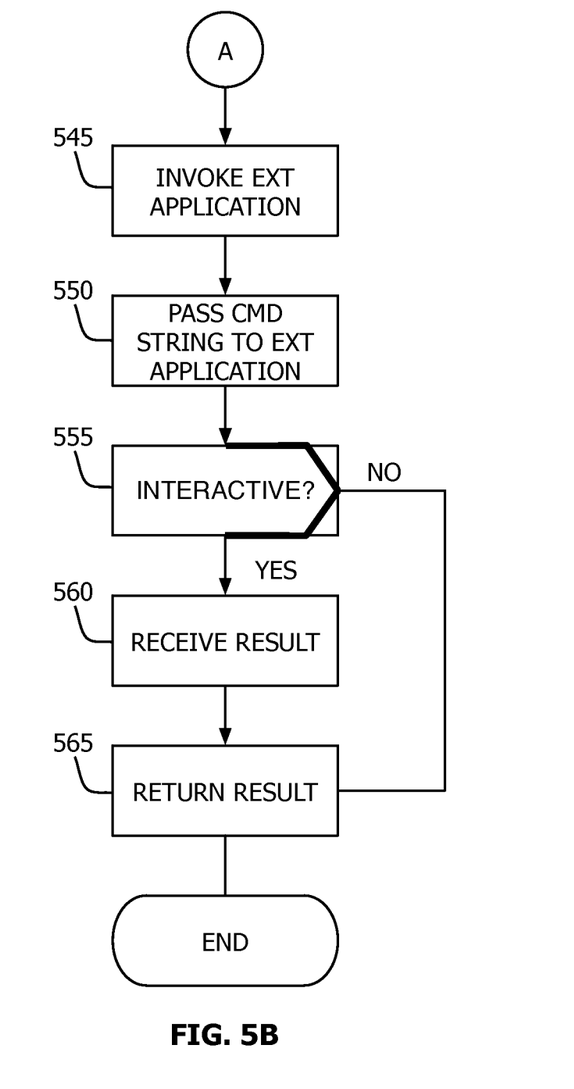

Referring to FIG. 5B, following the acts of block 540 of FIG. 5A, the external application is invoked (block 545) and the command string is passed to it for execution (block 550). One of ordinary skill in the art will recognize that the acts of blocks 545 and 550 may often be combined into a single operation such as, for example, when an external application is invoked via a command line.

If the external application was not invoked as an interactive application (the "No" prong of block 555), the result is returned (block 565) where after database processing completes. In the non-interactive or stand-alone mode of operation, it will be recognized that the external application may continue to execute. If the external application was invoked as an interactive application (the "Yes" prong of block 555), results are received from the external application (block 560) and passed to the entity making the original database query such as, for example, another application (block 565).

By way of example, consider an object-oriented database that includes a class of 'company' objects (e.g., one entry for company ABC, one entry for company DEF and so forth), where one attribute of the company class is ' StockSymbol'—the stock market symbol used to uniquely identify the company. In accordance with the above described registration method (see FIG. 1), a federated product object can be instantiated that identifies the target external application (e.g., a web browser application). In addition, a federated interface object can be instantiated that specifies the means of invocation as 'URL' (e.g., via the AccessMethod attribute), the mode of activation as 'stand-alone' (e.g., via the AccessMode attribute) and the invocation string as 'http://www.StockTickerInfo.com/?symbol=$StockSymbol$'.

Finally, the relationships functionally coupling the company object class with the federated interface and product objects can be created. In accordance with federation operation 500, when any instance of a company object is retrieved (e.g., the instance associated with company ABC), the value of that instance's StockSymbol attribute retrieved from the instance itself will be substituted into the associated federated interface object's invocation or access string to create an application command string (e.g., http://www.StockTickerInfo.com/?symbol=ABC). The web browser application identified in the federated product object is then invoked (through, for example, known application programming interface or scripting techniques) and the command sting is passed to the browser for interpretation or execution. Finally, the browser application will display the company's associated stock market information (e.g., share price over a specified time period).

Various changes in the components as well as in the details of the illustrated operational methods are possible without departing from the scope of the following claims. For example, while the illustrative embodiments have been described in terms of a configuration management database using object-oriented technology, the claimed invention is not so limited. Specifically, the application registration and invocation techniques described herein may be used in conjunction with substantially any database (e.g., relational databases). In addition, illustrative objects (e.g., federated interface object 220, federated product object 225, federated interface link object 230, federated product link object 235 and federated key link object 400) have been described in terms of a number of specific attributes. It will be understood, however, that such objects may include more attributes than listed in tables ZZ-W (e.g., class and instance identifiers). Further, some of the attributes listed in the above tables may be inherited from parent objects rather than being intrinsic to the federation objects themselves (e.g., source and destination references in the link objects 230 and 235). Also, in the above description federation has been described as it is applied to configuration items. However, this limitation is not required. For example, in an object-oriented environment as described herein relationships are themselves objects and, as such, may be federated just like any other item. That is, a relationship may be linked to an external product via a link object.

It will be further recognized that acts in accordance with FIG. 1 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

What is claimed is:

1. An information technology (IT) system for automatically invoking external applications that are external to a configuration management database, in response to database queries, the IT system comprising:
   a programmable control device; and
   a configuration management database storing a plurality of configuration items about resource components within the IT system, wherein the configuration management database is configured to cause the programmable control device to:
      receive a database query for one or more configuration items within the configuration management database;
      retrieve at least one configuration item from the configuration management database in response to the database query;
      determine whether the at least one configuration item is associated with an external application;
      in response to the at least one configuration item being determined as associated with the external application, identify an invocation string associated with the external application from an object linked to the at least one configuration item;
      obtain at least one variable from the at least one configuration item;
      insert the at least one variable from the at least one configuration item into the invocation string to create an application execution command; and
      launch the external application based on the application execution command.

2. The IT system of claim 1, wherein the configuration management database includes a relational database, and the resource components include computing devices and software installed on the computing devices within the IT environment.

3. The IT system of claim 1, wherein the external application is invoked as an interactive application such that a result is returned to the configuration management database from the external application.

4. The IT system of claim 3, wherein the programmable control device is configured to transfer the result to an application that issued the database query.

5. The IT system of claim 1, wherein the programmable control device is configured to:
   determine whether the external application is federated to a class of configuration items; and
   compare one of more values associated with the at least one configuration item with a specified filter pattern,
   wherein the programmable control device is configured to launch the external application only when the comparison identifies a match between the one or more values associated with the at least one configuration item and the specified filter pattern.

6. The IT system of claim 1, wherein the configuration management database includes at least one federated interface object linked to the at least one configuration item, and a federated product object linked to the at least one federated interface object, the at least one federated interface object including the invocation string associated with the external application, the federated product object including information identifying the external application.

7. The IT system of claim 6, wherein the programmable control device is configured to determine whether the at least one configuration item is associated with the external application based on at least one of the at least one federated interface object and the federated product object.

8. The IT system of claim 6, wherein the programmable control device is to identify the invocation string from the at least one federated interface object.

9. The IT system of claim 6, wherein the at least one federated interface object includes information that indicates a manner in which the target application is to be launched, and information indicating whether the external application returns data to the configuration management database or operates as a stand-alone application.

10. The IT system of claim 6, wherein the least one federated interface object includes a first federated interface object and a second federated interface object, the second federated interface object having at least one different launch attribute than the first federated interface objection, the first and second federated interface objects being linked to the same configuration item.

11. A computer program product for automatically invoking external applications that are external to a configuration management database, in response to database queries within an information technology (IT) system, the computer program product having a non-transitory computer-readable medium storing executable instructions that when executed cause at least one processor to:
- receive a database query at a configuration management database storing a plurality of configuration items, the plurality of configuration items storing information about resource components within the IT system;
- retrieve at least one configuration item from the configuration management database in response to the database query;
- determine whether the at least one configuration item is associated with an external application;
- in response to the at least one configuration item being determined as associated with the external application, identify an invocation string associated with the external application from an object linked to the at least one configuration item;
- obtain at least one variable from the at least one configuration item;
- insert the at least one variable from the at least one configuration item into the invocation string to create an application execution command; and
- launch the external application based on the application execution command.

12. The computer program product of claim 11, wherein the executable instructions that when executed cause the at least one processor to:
- invoke the external application as an interactive application such that a result is returned to the configuration management database from the external application; and
- transfer the result to an application that issued the database query.

13. The computer program product of claim 11, wherein the executable instructions that when executed cause the at least one processor to:
- determine whether the external application is federated to a class of configuration items;
- compare one of more values associated with the at least one configuration item with a specified filter pattern; and
- launch the external application only when the comparison identifies a match between the one or more values associated with the at least one configuration item and the specified filter pattern.

14. The computer program product of claim 11, wherein the configuration management database includes at least one federated interface object linked to the at least one configuration item, and a federated product object linked to the at least one federated interface object, the at least one federated interface object including the invocation string associated with the external application, the federated product object including information identifying the external application, wherein the executable instructions that when executed cause the at least one processor to:
- determine whether the at least one configuration item is associated with the external application based on at least one of the at least one federated interface object and the federated product object; and
- identify the invocation string from the at least one federated interface object.

15. The computer program product of claim 14, wherein the at least one federated interface object includes information that indicates a manner in which the target application is to be launched, and information indicating whether the external application returns data to the configuration management database or operates as a stand-alone application.

16. The computer program product of claim 14, wherein the least one federated interface object includes a first federated interface object and a second federated interface object, the second federated interface object having at least one different launch attribute than the first federated interface objection, the first and second federated interface objects being linked to the same configuration item.

17. The computer program product of claim 14, wherein the configuration management database includes a federated key link object that logically couples the at least one configuration item and the federated product object, the federated key link object including a key value, one or more fields that identify the at least one configuration item, and one or more fields that identify the external application.

18. A computer-implemented method for automatically invoking external applications that are external to a configuration management database, in response to database queries within an information technology (IT) system, the method being performed by at least one processor, the method comprising:
- receiving a database query at a configuration management database storing a plurality of configuration items, the plurality of configuration items storing information about resource components within the IT system;
- retrieving at least one configuration item from the configuration management database in response to the database query;
- determining whether the at least one configuration item is associated with an external application;
- in response to the at least one configuration item being determined as associated with the external application, identifying an invocation string associated with the external application from an object linked to the at least one configuration item;
- obtaining at least one variable from the at least one configuration item;
- inserting the at least one variable from the at least one configuration item into the invocation string to create an application execution command; and
- launching the external application based on the application execution command.

19. The computer-implemented method of claim 18, further comprising:
- invoking the external application as an interactive application such that a result is returned to the configuration management database from the external application; and
- transferring the result to an application that issued the database query.

20. The computer-implemented method of claim 18, wherein, before receiving the query at the configuration management database, the method further comprises:
- registering the external application as a federated application such that the external application is configured to be automatically invoked in response to the database query.

* * * * *